United States Patent
Vilsmeier

(10) Patent No.: US 8,781,188 B2
(45) Date of Patent: Jul. 15, 2014

(54) METHOD AND DEVICE FOR DISPLAYING CHANGES IN MEDICAL IMAGE DATA

(75) Inventor: Stefan Vilsmeier, München (DE)

(73) Assignee: Brainlab AG, Feldkirchen (DE)

( * ) Notice: Subject to any disclaimer, the term of this patent is extended or adjusted under 35 U.S.C. 154(b) by 209 days.

(21) Appl. No.: 13/350,869

(22) Filed: Jan. 16, 2012

(65) Prior Publication Data

US 2013/0083979 A1 Apr. 4, 2013

Related U.S. Application Data

(60) Provisional application No. 61/541,491, filed on Sep. 30, 2011.

(30) Foreign Application Priority Data

Sep. 30, 2011 (EP) ..................................... 11183615

(51) Int. Cl.
*G06K 9/00* (2006.01)
*G06K 9/32* (2006.01)

(52) U.S. Cl.
USPC .......................................... 382/128; 382/294

(58) Field of Classification Search
CPC .................. G06T 7/0012; G06T 2207/10016; G06T 2207/10076; G06T 2207/20016; G06T 19/00; G06T 19/003; G06T 2207/10072; G06T 2207/10148; G06T 2207/20221; G06T 3/00; G06T 7/0016; G06T 7/0044; G06F 19/321; G06F 17/30849; G06K 2209/05; G06K 9/3233; G06K 9/00228

See application file for complete search history.

(56) References Cited

U.S. PATENT DOCUMENTS

| | | | | |
|---|---|---|---|---|
| 6,097,833 | A * | 8/2000 | Lobregt et al. | 382/130 |
| 6,993,157 | B1 * | 1/2006 | Oue et al. | 382/103 |
| 7,127,090 | B2 * | 10/2006 | Kreang-Arekul et al. | 382/128 |
| 7,596,255 | B2 * | 9/2009 | Mathew et al. | 382/130 |
| 7,667,717 | B2 * | 2/2010 | Baudisch | 345/639 |
| 8,457,376 | B2 * | 6/2013 | Kitamura et al. | 382/128 |
| 2003/0035592 | A1 | 2/2003 | Cornog et al. | |
| 2005/0093890 | A1 * | 5/2005 | Baudisch | 345/639 |
| 2005/0268226 | A1 * | 12/2005 | Lipsky et al. | 715/515 |
| 2006/0030769 | A1 | 2/2006 | Ramamurthy et al. | |
| 2007/0167784 | A1 * | 7/2007 | Shekhar et al. | 600/443 |

FOREIGN PATENT DOCUMENTS

EP 2241253 10/2010

OTHER PUBLICATIONS

European Search Report corresponding to European Application No. 11 183 615, dated Apr. 17, 2012.
George Wolberg, "Image morphing: a survey", Jan. 1, 1998, pp. 360-372.

* cited by examiner

*Primary Examiner* — Manav Seth
(74) *Attorney, Agent, or Firm* — Tucker Ellis LLP

(57) ABSTRACT

Method for displaying changes in medical image data, comprising the steps of
  acquiring at least two medical anchor image datasets representing medical image data at different points in time,
  determining at least one transformation
  calculating at least one intermediate image dataset representing intermediate image data by using the transformation and
  displaying the medical image data represented by the anchor image datasets and the intermediate image dataset(s) as an image sequence.

14 Claims, 2 Drawing Sheets

METHOD AND DEVICE FOR DISPLAYING CHANGES IN MEDICAL IMAGE DATA

RELATED APPLICATION DATA

Figure 1:
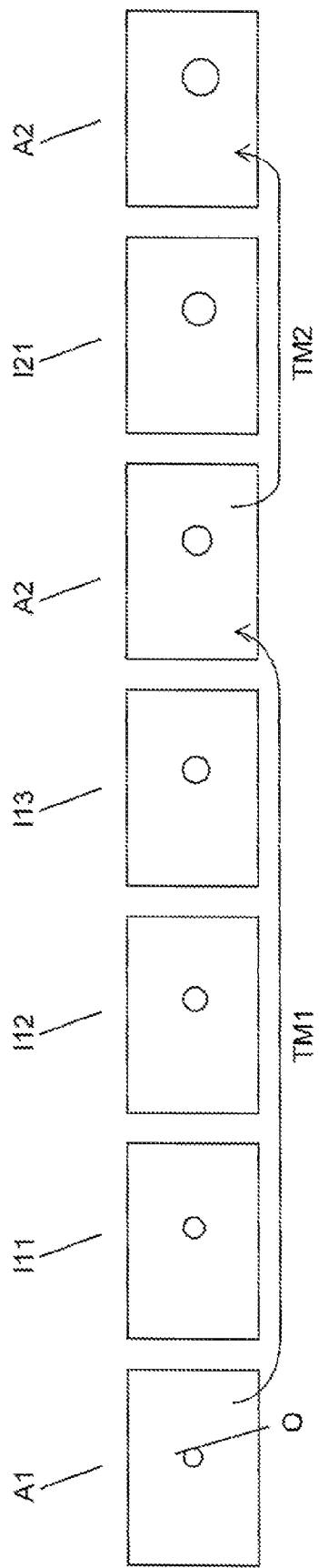

This application claims priority of the U.S. Provisional Application No. 61/541,491 filed on Sep. 30, 2011, which is incorporated herein by reference in its entirety.

The present invention relates to a method and an electronic device for displaying changes in medical image data.

Medical image data which have been acquired by different examinations at different points in time are typically compared side-by-side or through an overlay of the images. The medical image data may result from anatomical, metabolic or functional data. With the traditional approaches, it is difficult to judge the changes in the medical image data. It is therefore an object of the present invention to increase the perceivability of the changes in medical image data.

This problem is solved by the method, the electronic device and the computer program according to the independent claims. Advantageous embodiments are given in the dependent claims.

The first step of the method according to the present invention is acquiring at least two medical anchor image datasets representing medical image data at different points in time. The medical image data can be 2D or 3D image data. The image data might show, among others, anatomical, metabolic or functional information. The information can, for example, be acquired using imaging methods. As another option, the image data might be synthesized data, such as an atlas or a matched atlas.

In the field of medicine, imaging methods are used to generate image data (for example, two-dimensional or three-dimensional image data) of anatomical structures (such as soft tissues, bones, organs, etc.) of the human body. Medical imaging methods are understood to mean advantageously apparatus-based imaging methods (so-called medical imaging modalities and/or radiological imaging methods), such as for instance computed tomography (CT) and cone beam computed tomography (CBCT; in particular volumetric CBCT), x-ray tomography, magnetic resonance tomography (MRT or MRI), conventional x-ray, sonography and/or ultrasound examinations, and positron emission tomography. Analytical devices are in particular used to generate the image data in apparatus-based imaging methods. The imaging methods are in particular used for medical diagnostics, to analyse the anatomical body in order to generate images which are described by the image data. The imaging methods are in particular used to detect pathological changes in the human body.

The expression "acquiring data" encompasses in particular (within the framework of a data processing method) the scenario in which the data are determined by the data processing method or program. Determining data in particular encompasses measuring physical quantities and transforming the measured values into in particular digital data and/or computing the data by means of a computer, in particular computing the data within the method of the invention. The meaning of "acquiring data" in particular also encompasses the scenario in which the data are received or retrieved by the data processing method or program, for example from another program, a previous method step or a data storage medium, in particular for further processing by the data processing method or program. Thus, "acquiring data" can also mean for example mean waiting to receive data and/or receiving the data. The received data can for example be inputted via an interface. "Acquiring data" can also mean that the data processing method or program performs steps in order to (actively) receive or retrieve the data from a data source, for instance a data storage medium (such as for example a ROM, RAM, database, hard disc, etc.) or via the interface (for instance, from another computer or a network). The data can achieve the state of being "ready for use" by performing an additional step before the acquiring step. In accordance with this additional step, the data are generated in order to be acquired. The data are in particular detected or captured (for example, by an analytical device). Alternatively or additionally, the data are inputted in accordance with the additional step, for instance via interfaces. The data generated can in particular be inputted (for instance, into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. Thus, "acquiring data" can also involve commanding a device to obtain and/or provide the data to be acquired. The acquiring step in particular does not involve an invasive step which would represent a substantial physical interference with the body requiring professional medical expertise to be carried out and entailing a substantial health risk even when carried out with the required professional care and expertise. Acquiring, in particular determining, data in particular does not involve a surgical step and in particular does not involve a step of treating a human or animal body using surgery or therapy. This also applies in particular to any steps directed to determining data. In order to distinguish the different data used by the present method, the data are denoted (i.e. referred to) as "XY data" and the like and are defined by the information which they describe.

An atlas typically consists of a plurality of generic models of objects, wherein the generic models of the objects together form a complex structure. The atlas of a femur, for example, can comprise the head, the neck, the body, the greater trochanter, the lesser trochanter and the lower extremity as objects which make up the complete structure. The atlas of a brain, for example, can comprise the telencephalon, the cerebellum, the diencephalon, the pans, the mesencephalon and the medulla as the objects which make up the complex structure. An atlas can further pertain to a plurality of different objects, such as organs and bones.

One application of such an atlas is in the segmentation of medical images, wherein the atlas is matched to medical image data, and the image data are compared with the matched atlas in order to assign a point (a pixel or voxel) of the image data to an object of the matched atlas, thereby segmenting the image data into objects. This aspect of an atlas might be used in the segmentation as described later in this document.

The second step is determining at last one transformation. The transformation characterizes the correlation between a pair of anchor image datasets which follow each other in time. In other words, the transformation represents a (mathematical) rule describing a transition from one image dataset to another. If there are more than two medical anchor image datasets, a transformation is preferably determined for each pair of temporally consecutive medical anchor image datasets.

The transformation can in particular be a transformation matrix. Each component of the matrix might be a vector. The number of dimensions of the vector preferably matches the number of dimensions of the image data.

The third step is calculating at least one intermediate image dataset by using the transformation. The transformation represents the changes between medical anchor image datasets. Preferably, the transformation coefficients are divided by N+1, wherein N is the number of intermediate image datasets between two anchor image datasets to be calculated. An intermediate image dataset is then calculated based on the temporally previous image dataset, starting with an anchor image dataset, and the divided transformation coefficients. In this exemplary embodiment, it is assumed that the temporal distance between two intermediate images is equal. However, it is also possible to have steps of varying length between two images.

The fourth step is displaying the medical image data represented by the anchor image datasets and the intermediate image dataset(s) as an image sequence. The image sequence thus represents a smooth transition from one anchor image dataset to another anchor image dataset, thus allowing to easily track changes in the medical image data. The image sequence might be displayed repeatedly in the loop or forwards and backwards. An image is a representation of image data which is able to be displayed, in particular in two dimensions on a display device. If the image data is two-dimensional, then it might be directly used as an image. If the image data is three-dimensional, then an image might be calculated from the image data. In other words, an image is a representation which can be displayed, and this image, or representation, can be calculated from corresponding image data.

According to one embodiment of the invention, the transformation is determined by elastic image fusion. The result of the elastic image fusion is for example a transformation matrix of movement vectors for a plurality of image elements (pixels in a 2D image dataset and voxels in a 3D image dataset) or all image elements. Image fusion can be performed for both 2D and 3D image data.

If an image dataset, that is an anchor image dataset or an intermediate image dataset, represents three-dimensional image data, then a two-dimensional representation of the three-dimensional image data can be calculated as an image and this image, or two-dimensional representation, is used in the image sequence. Preferably, the two-dimensional representation is calculated using volume rendering. In general, volume rendering is used to calculate a two-dimensional projection of a three-dimensional image dataset.

In an embodiment, the intermediate image datasets represent two-dimensional medical image data. This is particularly useful to reduce the computational complexity if the image sequence is to be displayed on a display device for two-dimensional images and the viewing direction, that is the perspective on the image data, is not to be changed. The computational complexity is reduced because, if the anchor image datasets represent 3D images, voxels having no influence on the 2D representation of the intermediate image datasets do not have to be calculated. In addition, the storage capacity needed to store the intermediate image data is less for 2D images.

According to another embodiment, the anchor image datasets comprise time stamps representing, for example, the time at which an image dataset was generated or the time the image data represented by the image dataset was taken. The number of intermediate image datasets between two anchor image datasets is then calculated based on the time stamps of these two anchor image datasets. In this embodiment, the displayed image sequence represents a linear time line over the entire range of anchor image datasets. In other words, if the time interval between temporally neighbouring anchor image datasets is irregular, the number of intermediate image datasets is adapted to this irregular spacing, thus achieving a smooth image sequence.

In one embodiment, the anchor image datasets are segmented to identify at least one object of interest within the anchor image datasets. Such an object of interest can, for example, be a tumor or a body structure, such as an organ, a bone or a part of a bone, such as a bone portion separated by a fracture.

With the segmented image datasets, it is possible to determine dedicated transformations for the object or objects of interest and the rest of the image dataset. With this approach, the changes of the object or objects of interest in the image can be calculated more accurately for the intermediate image datasets.

In another embodiment, at least one of the anchor image datasets is modified to harmonize the anchor image datasets. In particular, an anchor image dataset is modified such that reference objects are harmonized, for example have the same or highly similar shape and/or size, in the anchor image datasets. Such reference objects may be bones or parts thereof, organs or tissue structures. For example, the bladder of an imaged body may have different fill levels in different anchor image datasets, or the spine may be bent differently. By the harmonization, differences of a reference object in different anchor image datasets are compensated, such that the attention is focused on the change of an object of interest, such as a tumor or a bone. The transformation is then determined after all intended anchor image datasets have been modified.

In an exemplary implementation of this embodiment, at least one reference object is determined in an anchor image dataset by segmentation. The anchor image dataset is then modified such that the reference object matches a corresponding target reference object, for example by elastic image fusion. This target reference object can be an object derived from another anchor image dataset by segmentation, an object derived from corresponding reference objects of two or more anchor image datasets or a generic object, for example taken from a database. More than one reference object may be defined.

As an option, at least one object of interest is determined in the anchor image dataset to be modified, preferably by segmentation. The object of interest, which might for example be a tumor or a bone, is then excluded from the modification of the anchor image dataset and re-inserted into the modified anchor image dataset. With this approach, the object of interest is preserved in the anchor image dataset while the rest is harmonized.

It is possible that the medical image data represented by the anchor image datasets were recorded from different viewing directions, in particular if the time between the recording of the images is long. Therefore, in another embodiment, the viewing direction of each anchor image dataset is determined and the viewing direction of an intermediate image dataset is calculated from the viewing directions of the two anchor image datasets between which the intermediate image dataset is located. This results in a smooth transition of the viewing direction between two anchor image datasets over the intermediate image datasets. The viewing direction can be comprised in an anchor image dataset, represented by viewing direction data. In addition or as an alternative, the viewing direction can be determined from the medical image represented by the anchor image dataset, for example, by structures, such as bones, which can be assumed as being constant over time, thus allowing a conclusion on the viewing direction. In particular, the viewing direction can be calculated relative to a viewing direction of another anchor image dataset.

In another embodiment, the viewing direction of the anchor image datasets is harmonized. This means that all images generated from the image datasets have the same viewing direction. This is particularly suitable if the image datasets represent three-dimensional image data, such that the plane in which the image data is projected when calculating an image can be adapted. Preferably, the viewing directions of the anchor image datasets are harmonized before the transformations are determined or the intermediate image datasets are calculated.

In another embodiment, an intermediate image dataset is stored in a cloud database. This allows to share the image datasets while at the same time reducing the demand for local storage space.

According to another embodiment, an intermediate image dataset is calculated in a cloud. This reduces the demand for computational power on a local machine on which the method is performed. This accelerates the generation of the intermediate image datasets without computational constraints.

In another embodiment, the image sequence is displayed by video streaming. The streaming is preferably performed through the Internet. Preferably, the image sequence is compressed using a state-of-the-art compression algorithm.

The method in accordance with the invention is in particular a data processing method. The data processing method is preferably performed using technical means, in particular a computer. In particular, the data processing method is executed by or on the computer. The computer in particular comprises a processor and a memory in order to process the data, in particular electronically and/or optically. The calculating steps described are in particular performed by a computer. Determining or calculating steps are in particular steps of determining data within the framework of the technical data processing method, in particular within the framework of a program. A computer is in particular any kind of data processing device, in particular electronic data processing device. A computer can be a device which is generally thought of as such, for example desktop PCs, notebooks, netbooks, etc., but can also be any programmable apparatus, such as for example a mobile phone or an embedded processor. A computer can in particular comprise a system (network) of "sub-computers", wherein each sub-computer represents a computer in its own right. The term of computer encompasses a cloud computer, in particular a cloud server. The term of cloud computer encompasses cloud computer system in particular comprises a system of at least one cloud computer, in particular plural operatively interconnected cloud computers such as a server farm. Preferably, the cloud computer is connected to a wide area network such as the world wide web (WWW). Such a cloud computer is located in a so-called cloud of computers which are all connected to the world wide web. Such an infrastructure is used for cloud computing which describes computation, software, data access and storage services that do not require end-user knowledge of physical location and configuration of the computer that delivers a specific service. In particular, the term "cloud" is used as a metaphor for the internet (world wide web). In particular, the cloud provides computing infrastructure as a service (IaaS). The cloud computer may function as a virtual host for an operating system and/or data processing application which is used for executing the inventive method. Preferably, the cloud computer is an elastic compute cloud (EC2) provided by Amazon Web Services™. A computer in particular comprises interfaces in order to receive or output data and/or perform an analogue-to-digital conversion. The data are in particular data which represent physical properties and/or are generated from technical signals. The technical signals are in particular generated by means of (technical) detection devices (such as for example devices for detecting marker devices) and/or (technical) analytical devices (such as for example devices for performing imaging methods), wherein the technical signals are in particular electrical or optical signals. The technical signals represent in particular the data received or outputted by the computer.

The present invention further relates to an electronic device for displaying changes in medical image data. This device comprises a control unit configured to carry out the method steps as explained above.

The invention also relates to a program which, when running on a computer or when loaded onto a computer, causes the computer to perform one or more or all of the method steps described herein and/or to a program storage medium on which the program is stored (in particular in a non-transitory form) and/or to a computer on which the program is running or into the memory of which the program is loaded and/or to a signal wave, in particular a digital signal wave, carrying information which represents the program, in particular the aforementioned program, which in particular comprises code means which are adapted to perform any or all of the method steps described herein.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, in particular computer-readable data storage medium comprising computer-usable, in particular computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, in particular a data processing device comprising a digital processor (central processing unit—CPU) which executes the computer program elements and optionally a volatile memory (in particular, a random access memory—RAM) for storing data used for and/or produced by executing the computer program elements. Within the framework of the present invention, a computer-usable, in particular computer-readable data storage medium can be any data storage medium which can include, store, communicate, propagate or transport the program for use on or in connection with the instruction-executing system, apparatus or device. The computer-usable, in particular computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. Preferably, the data storage medium is a non-volatile data storage medium. The computer program product and any software and/or hardware described here form the various means for performing the functions of the invention in the example embodiments. The computer and/or data processing device can in particular include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or vibration element incorporated into an instrument).

Different advantageous features disclosed in this document can be combined in accordance with the invention as long as technically sensible and feasible. In particular, a feature of one embodiment which has the same or similar function of another feature of another embodiment can be exchanged. In particular, a feature of one embodiment which supplements a further function to another embodiment can be added to the other embodiment.

The present invention shall be explained in more detail with reference to the attached Figures which show:

FIG. 1 an image sequence and

Figure 2:
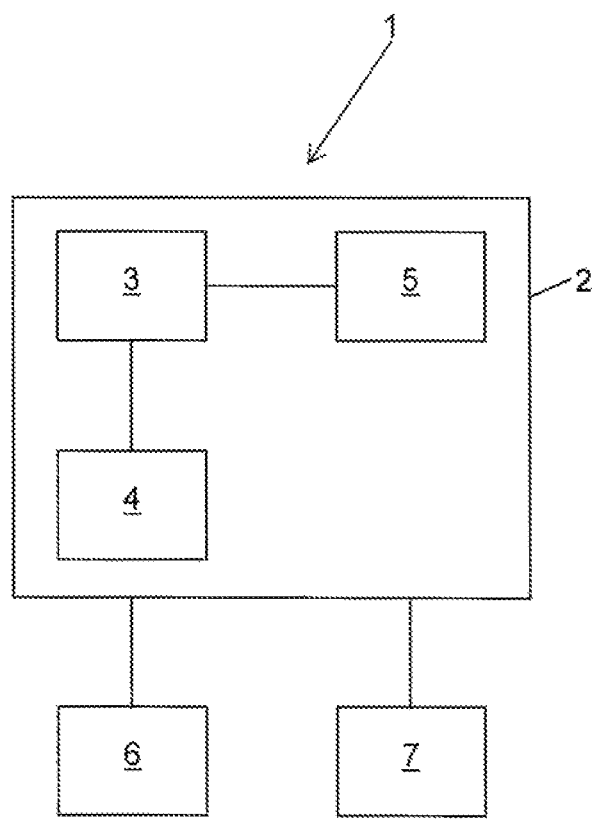

FIG. 2 a device for carrying out the invention.

FIG. 1 schematically shows an image sequence of medical image data represented by image datasets. In this example, the image data are two-dimensional, such that the image data can directly be displayed as an image and the terms "image" and "image data" are used synonymously. In a generalization, the images shown in FIG. 1 are two-dimensional representations of image data represented by image datasets.

The image sequence comprises an anchor image A1 taken at a time T1, an anchor image A2 taken at a time T2 and an anchor image A3 taken at a time T3. Within the anchor images A1 to A3, an object O, such as a tumor, is shown, wherein the size and the position (spatial location and/or rotational alignment) has changed over time. All other elements of the images have been omitted for clarity reasons.

The time interval between T1 and T2 in the present example is twice as long as the time interval between T2 and T3. In order to obtain a smooth image sequence, the number of intermediate images between the anchor images A1 and A2 is larger than the number of intermediate images between the anchor images A2 and A3. In this example, three intermediate images I11, I12 and I13 are calculated between the anchor images A1 and A2, and only one intermediate image I21 is calculated between the anchor images A2 and A3.

For calculating the intermediate image datasets, transformation matrices TM1 and TM2 are determined. In this example, the transformation matrix T1 is determined by elastic image fusion of the anchor images A1 and A2 and the transformation matrix T2 is determined by elastic image fusion of the anchor images A2 and A3.

Using the transformation matrix T1, the intermediate image datasets representing the image data I11, I12 and I13 are calculated starting from the anchor image A1. In analogy, the intermediate image dataset representing the intermediate image data I21 is calculated using the transformation matrix T2 starting from anchor image A2.

The anchor images and the interposed intermediate images are then displayed as an image sequence, showing a smooth transition between the anchor images, which means that the changes in the anchor images become clearly perceivable.

FIG. 2 schematically shows an electronic device 1 for carrying out the present invention. The device 1 comprises a computer 2 having a control unit 3, a memory 4 and an interface 5. The computer 2 is connected to a display device 6 and an input device 7, such as a keyboard and/or a mouse.

Via the interface 5, the computer 2 acquires the anchor image datasets representing the anchor images A1, A2 and A3. The interface 5 can be directly connected to an imaging apparatus which records the anchor images and/or to storage device or a network in which the anchor image datasets are stored.

The anchor images A1 to A3 are then temporarily stored in the memory 4. The control unit 3 uses the anchor images A1 to A3 to calculate the intermediate images I11, I12, I13 and I21 as explained above. The anchor images and the intermediate images are then stored as an image sequence in the memory 4. If the images are three-dimensional images, they are optionally converted into two-dimensional images before they are stored in the memory 4. The image sequence is then displayed on the display device 6, such as a monitor. The input device 7 is used to input commands and information, such as the number of intermediate images to be calculated, into the computer 2.

The invention claimed is:

1. A method for displaying changes in medical image data, comprising:

acquiring at least two medical anchor image datasets representing medical image data at different points in time;

determining at least one object of interest in at least one of the anchor image datasets and modifying the at least one anchor image dataset to harmonize the anchor image datasets by harmonizing reference objects in the anchor image datasets such that differences of a reference object in different anchor image datasets are compensated, wherein the object of interest is excluded from the modification and re-inserted into the modified anchor image dataset;

determining at least one transformation, wherein the at least one transformation describes a transition from one anchor image dataset to a temporally consecutive anchor image dataset after the harmonization;

calculating at least one intermediate image dataset representing intermediate image data by using the transformation; and displaying the medical image data represented by the anchor image datasets and the intermediate image dataset(s) as an image sequence.

2. The method of claim 1, wherein the transformation is determined by elastic image fusion.

3. The method of claim 1, wherein the transformation is a transformation matrix.

4. The method of claim 1, wherein, if an image dataset, that is an anchor image dataset or an intermediate image dataset, represents three-dimensional image data, then a two-dimensional representation of the three-dimensional image data is calculated and the two-dimensional representation is used in the image sequence.

5. The method of claim 4, wherein the two-dimensional representation is calculated using volume rendering.

6. The method of claim 1 wherein the intermediate image datasets represent two-dimensional medical image data.

7. The method of claim 1, wherein the anchor image datasets comprise time stamps and the number of intermediate image datasets between two anchor image datasets is calculated based on the time stamps of these two anchor image datasets.

8. The method of claim 1, wherein the anchor image datasets are segmented to identify at least one object of interest within the anchor image datasets.

9. The method of claim 1, wherein the viewing direction of each anchor image dataset is determined and the viewing direction of an intermediate image dataset is calculated from the viewing directions of the two anchor image datasets between which the intermediate image dataset is located.

10. The method according to claim 1, wherein an intermediate image dataset is stored in a cloud database.

11. The method according to claim 1, wherein an intermediate image dataset is calculated in a cloud.

12. The method according to claim 1, wherein the image sequence is displayed by video streaming.

13. An electronic device for displaying changes in medical image data, comprising a control unit configured to carry out the method steps as claimed in claim 1.

14. A non-transitory computer readable medium comprising computer executable instructions adapted to cause a computer to display changes in medical image data, comprising: acquiring at least two medical anchor image datasets representing medical image data at different points in time; determining at least one object of interest in at least one of the anchor image datasets and modifying the at least one anchor image dataset to harmonize the anchor image datasets by harmonizing reference objects in the anchor image datasets such that differences of a reference object in different anchor image datasets are compensated, wherein the object of interest is excluded from the modification and re-inserted into the modified anchor image dataset; determining at least one transformation, wherein the at least one transformation describes a transition from one anchor image dataset to a temporally consecutive anchor image dataset after the harmonization; calculating at least one intermediate image dataset representing intermediate image data by using the transformation; and displaying the medical image data represented by the anchor image datasets and the intermediate image dataset(s) as an image sequence.

* * * * *